Sept. 24, 1963  D. E. LUPFER  3,104,810
METHOD OF AND APPARATUS FOR INTEGRATING PNEUMATICALLY
Filed Dec. 27, 1960

INVENTOR.
D. E. LUPFER
BY Hudson & Young
ATTORNEYS

United States Patent Office 3,104,810
Patented Sept. 24, 1963

3,104,810
METHOD OF AND APPARATUS FOR INTEGRATING PNEUMATICALLY
Dale E. Lupfer, Bartlesville, Okla., assignor to Phillips Petroleum Company, a corporation of Delaware
Filed Dec. 27, 1960, Ser. No. 78,692
5 Claims. (Cl. 235—61)

This invention relates to a method of and apparatus for performing an integration pneumatically. In one specific aspect, this invention relates to a modification of a conventional pneumatic force balance relay to produce a pneumatic integrator.

The use of electrical integrators in automatic control systems is well known in the art. For example, an electrical concentration integrator can be employed in the measurement of the concentration of a constituent in a reactor. The cost of installing and maintaining electrical integrators is relatively high. Therefore, an inexpensive integrator adaptable to a wide variety of control systems is highly desirable.

Accordingly, an object of this invention is to provide a method of and apparatus for performing an integration pneumatically.

Another object of this invention is to modify a conventional pneumatic force balance relay to produce a pneumatic integrator.

Other objects, and advantages and features of my invention will be readily apparent to those skilled in the art in the following description and the appended claims.

Conventional pneumatic force balance relays are conventionally employed in control systems to perform arithmetical operations as adding, subtracting and multiplying by a constant. I have discovered that by placing an adjustable pneumatic restriction $R_1$ in a signal input line to a bellows of volume $V_1$ which has a an adjustable pneumatic capacitance $C_1$ and by placing a restriction $R_2$ in a line communicating between the output and a second input bellows of volume $V_2$ having a pneumatic capacitance $C_2$, a conventional pneumatic relay will be converted to an integrator providing that $R_1C_1$ equals $R_2C_2$ with the values for $R_1$, $R_2$, $C_1$ and $C_2$ in consistent units. $R_1C_1$ and $R_2C_2$ are the time constants of the two pneumatic circuits of the modified force balance relay. I have further discovered that an adjustable pneumatic restriction $R_3$ can be placed in a third input line to a bellows having a volume $V_3$ and a pneumatic capacitance $C_3$ so that the time constants $R_1C_1$, $R_2C_2$, $R_3C_3$ are equal. The pneumatic relay is thus converted to a dual integrator so that its output will be the difference between two integrated inputs.

Figure 1:
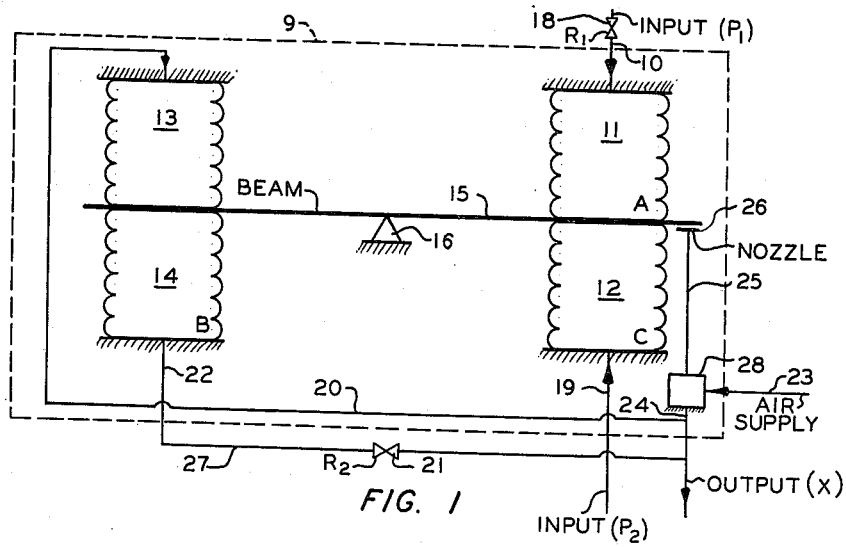
FIGURE 1 is a diagrammatic representation of one embodiment of the inventive pneumatic integrator.

Referring to FIGURE 1 there is illustrated a conventionally pneumatic relay 9 modified as hereinafter described. Bellows 11, 12, 13, and 14 place a force upon a beam 15. The force exerted by each of said bellows is proportional to the pneumatic pressure contained therein. A beam-pivot means 16 is adjustable along beam 15. In order to balance beam 15, the ratio of the distances between pivot means 16 and each pair of directly opposing bellows is inversely equal to the ratio of the resulting forces applied to beam 15 by each said pair of bellows. Bellows 11, 14 and 12 are responsive to pneumatic pressure inputs A, B, and C, respectively. Bellows 13 is responsive to pneumatic pressure passed to said bellows 13 via conduit 20.

Air is supplied at a constant pressure via conduit 23 to a pressure-volume amplifier 28. A portion of the air supplied is emitted from amplifier 28 to conduit 25 and through nozzle 26. A back pressure is developed in conduit 25, the value of said back pressure is determined by the position of beam 15 with respect to nozzle 26. A very small change in the position of beam 15 with respect to nozzle 26 results in a very large pressure change in the amplifier output conduit 24. A typical gain value of a commercial nozzle amplifier arrangement would result in an approximate 9000 p.s.i. output change per inch change in beam 15 position with respect to nozzle 26.

In order to more fully understand the operation of a conventional force balance relay, it is assumed that input pressures B and C are constant and that input pressure A has been increased from some arbitrary pressure level to a new pressure level. Beam 15 will move towards nozzle 26 causing the back pressure in conduit 25 to increase. This change in back pressure will be amplified so that the pressure in conduit 24 will increase and in a like manner increase the pressure in feedback bellows 13. The pressure in conduits 24 and 20 will continue to increase until the point is reached whereby bellows 13 exerts a force on beam 15 sufficient to counteract the initial force change on the beam caused by bellows 11. The increase of pressure in conduits 24 and 20 necessary to effect a balanced beam is dependent upon the position of pivot means 16 along beam 15. If pivot means 16 is nearer to bellows 13 than to bellows 11, the output pressure (X) and the pressure in bellows 13 will change to a greater degree than the change in input pressure A. It can be seen that if input pressure B is increased, the output pressure (X) will increase to the same degree regardless of the pivot position as bellows 13 and 14 are directly opposed. An increase in input pressure C will cause the output pressure X to decrease. The decrease in output pressure X will again be determined by the position of pivot means 16. The operation of the conventional forced balance relay can be illustrated by the following equation:

$$X(\text{output}) = G(A-C) + B$$

where G is the relay gain and is equal to $m/n$; $m$ is the distance between pivot means 16 and bellows 11; $n$ is the distance between pivot means 16 and bellows 13.

The conventional force balance relay 9 is modified by placing an adjustable restriction 18 ($R_1$) in conduit 10. Conduit 27 is added to connect output conduit 24 to input conduit 22. An adjustable restriction 21 ($R_2$) is placed in conduit 27.

Figure 2:
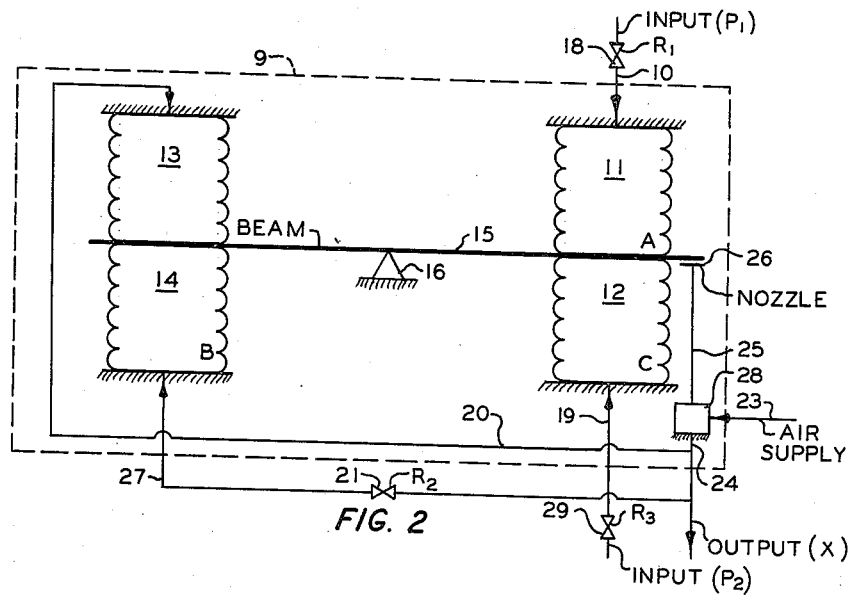
FIGURE 2 is a diagrammatic representation of another embodiment of the inventive pneumatic integrator.

Referring to FIGURE 2, there is illustrated the modified conventional pneumatic relay of FIGURE 1 with a further modification. Said further modification consists of placing an adjustable restriction 29 ($R_3$) in conduit 19. Measuring pressure drop across valves 18, 21 and 29 and dividing each said pressure drop by the quantity of flow through each said valve is the means whereby the values for $R_1$, $R_2$ and $R_3$ are obtained.

Referring again to the modified pneumatic relay of FIGURE 1, a differential equation can be written to state that the change in pressure A in bellows 11 with respect to time is proportional to the net inflow or outflow of gas into bellows 11 and inversely proportional to the bellows capacity $C_1$. The equation is:

$$\frac{dA}{dt} = \frac{W_1}{C_1}$$

where $t$ is time; $C_1$ is the pneumatic capacitance of bellows 11 and that portion of conduit 10 between restriction 18 and bellows 11; $W_1$ is the quantity flow of air through $R_1$. $W_1$ is proportional to the pressure drop across $R_1$ and inversely proportional to the resistance $R_1$.

This can be expressed by the following equation:

$$W_1 = \frac{P_1 - A}{A_1}$$

where $P_1$ is the pressure in bellows 11. This equation is then substituted into the above differential equation to obtain:

$$\frac{dA}{dt} = \frac{P_1 - A}{R_1 C_1}$$

Transferring this differential equation to the Laplace domain, the equation becomes:

$$AS = \frac{P_1 - A}{R_1 C_1}$$

where S is the Leplace operator. Solving for the ratio of output pressure to input pressure which is the transference of the passive pneumatic RC circuit, the following equation will be obtained:

$$\frac{A}{P_1} = \frac{1}{R_1 C_1 S + 1} \text{ or } A = \frac{P_1}{R_1 C_1 S + 1}$$

Upon resolving the equation which describes the pressure in bellows 14 in a like manner, the following equation will be obtained:

$$B = \frac{X}{R_2 C_2 S + 1}$$

The two expressions describing A and B can be substituted into the original static equation for the conventional relay of FIGURE 1 and the following equation is thereby obtained:

$$X = G\left[\frac{P_1}{R_1 C_1 S + 1} - P_2\right] + \frac{X}{R_2 C_2 S + 1}$$

where C equals $P_2$. As previously noted, a constant pressure $P_2$ is supplied to bellows 12 or if preferred, bellows 12 can be replaced with a spring adjusted to provide a force on beam 15 equivalent to the reaction obtainable by an input pressure $P_2$. $P_2$ is a constant in the equation and can be dropped insofar as the dynamic equation is concerned. By equating $R_2 C_2$ and $R_1 C_1$, the above equation is then reduced to:

$$X = P_1 \left(\frac{G}{R_1 C_1}\right)\left(\frac{1}{S}\right)$$

One skilled in the art and familiar with the Leplace transform techniques will readily recognize that the above equation is an equation for an integrator whose integration gain is $(G/R_1 C_1)$.

It is, of course, within the scope of this invention to employ the pneumatic relay so as to obtain either a plus or minus integration. Referring to FIGURE 1, if the pressure supplied to bellows 11 was constant instead of the pressure supplied to bellows 12, and if a restriction was placed in conduit 19, the equation would then become:

$$X = -P_1 \left(\frac{G}{R_1 C_1}\right)\left(\frac{1}{S}\right)$$

This would provide a negative integration.

By supplying two pneumatic pressure signals as disclosed by FIGURE 2 to bellows 11 and 12, and equating $R_1 C_1$, $R_2 C_2$, and $R_3 C_3$, the modified relay will integrate the two inputs and subtract the two integrations. The equation for the modification illustrated by FIGURE 2 thus becomes:

$$X = (P_1 - P_2)\left(\frac{G}{R_1 C_1}\right)\left(\frac{1}{S}\right)$$

The use of a pneumatic integrator is best illustrated by reference to a conventional automatic control system wherein it is necessary that an analog system of the process under automatic control be included as part of a controller. For example, an application of linear predictor control to a process characterized by a long dead time requires that an analog process be a part of the control system. Assuming that the transfer function of a plant process to be:

$$\frac{P_o}{P_i} = \frac{e^{-St}}{S^2 + 2S + 2}$$

where $P_o$ is representative of an output signal that is proportional to a measured output quantity of the process; $P_i$ is an input pressure representative of an input signal proportional to some measured input quantity of the process. The process can then be represented by the following block diagram:

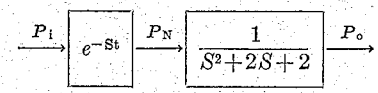

A pneumatic integrator approach can be used to simulate or construct an analog of that part of the process represented by:

$$\frac{P_o}{P_N} = \frac{1}{S^2 + 2S + 2}$$

In applying the pneumatic integrator, it is first necessary to solve for $P_o$ in the above equation. From the above equation, it is obvious that $P_o$ can be expressed as:

$$P_o = \frac{1}{S}\left[\frac{1}{S}(P_N - 2P_o) - 2P_o\right]$$

Figure 3:
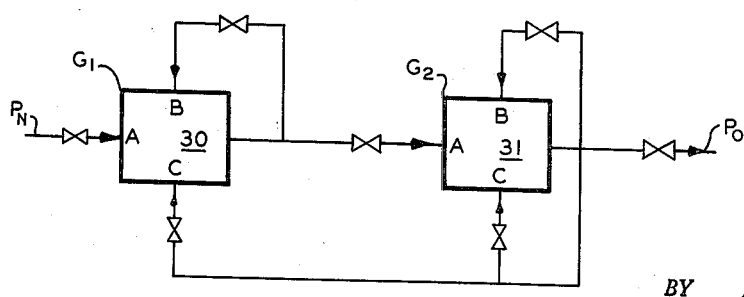
FIGURE 3 is a diagrammatic representation of the utility of the inventive pneumatic integrator of FIGURE 2.

It is noted that in solving the above equation two integrations are required. The quantity $(P_N - 2P_o)$ must first be integrated. This integrated quantity minus $2P_o$ must then also be integrated. Two pneumatic integrators as illustrated by FIGURE 2 are connected so as to produce the pneumatic system of FIGURE 3.

The three RC time constants of the first integrator 30 are set so as to equal $T_1$. The three RC time constants of the second integrator 31 are set so as to equal $T_2$. The overall transfer function relating $P_N$ to $P_o$ for the circuit of FIGURE 3 becomes:

$$\frac{P_o}{P_N} = \frac{1}{\left(\frac{T_1 T_2}{G_1 G_2}\right)S^2 + \left(\frac{T_1}{G_1}\right)S + 1}$$

It is noted that this transfer function is of the same form as that portion of the original process to be simulated. $T_1$, $T_2$, $G_1$, $G_2$ are selected so that the coefficients of $S^2$ and $S$ are identical to the corresponding coefficients of the process transfer function. This is to say:

$$\frac{T_1 T_2}{G_1 G_2} = 1 \qquad \frac{T_1}{G_1} = 2$$

The above two equations having four unknowns, any two of the adjustable parameters can be selected. For example, by stating that $T_1$ equals $T_2$ equals one time unit, then $G_1$ must be equal to 0.5 and $G_2$ must be equal to 2. By inserting these values in the simulated circuit, the transfer function will reduce to:

$$\frac{P_o}{P_N} = \frac{1}{S^2 + 2S + 2}$$

This is equivalent to the original process transfer function.

As will be evident to those skilled in the art, various modifications of this invention can be made, or followed, in the light of the foregoing disclosure and discussion without departing from the spirit or scope thereof.

I claim:

1. A pneumatic force balance instrument comprising, in combination, a balance means tiltable about an adjustable pivot means, a pneumatic system including a nozzle mounted for effective cooperation with said balance means and a force of air under pressure for supplying air to said nozzle, whereby tilting of said balance means varies the air flow to said nozzle to vary the pneumatic pressure in said system, a first element bearing against said balance means and being yieldably responsive to a restricted value of a pneumatic pressure representative of a first measured condition, a second element bearing against said balance means and being yieldably responsive to a restricted value of a pneumatic pressure representative of a second measured condition, a third element bearing against said balance means and being yieldably responsive to said pressure in said system, and a fourth element bearing against said balance means and being yieldably responsive to a restricted value of said pressure in said system, and means for transmitting a pressure representative of an integrated value of said first and second measured conditions.

2. The pneumatic force balance instrument of claim 1 wherein said first and fourth elements exert additive tilting forces against said balance means at spaced points on opposite sides of said pivot means, said second and said third elements exerting additive tilting forces against said balance means on opposite sides of said pivot means directly opposing said first and fourth elements respectively.

3. The pneumatic force balance instrument of claim 1 wherein a first restriction means employed to restrict the pneumatic pressure representing said first measured condition, a second restriction means employed to restrict the pneumatic pressure representing said second measured condition, and a third restriction means employed to restrict the pressure applied to said fourth element are adjustable.

4. The pneumatic force balance instrument of claim 3 wherein said first, second and third restriction means are adjusted so that $R_1C_1$ equals $R_2C_2$ equals $R_3C_3$, wherein $R_1$ is the resistance of said first restriction means, $R_2$ is the resistance of said second restriction means, $R_3$ is the resistance of said third restriction means, $C_1$ is the capacitance of said first element, $C_2$ is the capacitance of said second element, and $C_3$ is the capacitance of said fourth element.

5. A pneumatic force balance instrument responsive to a pneumatic pressure comprising, in combination, a balance means tiltable about an adjustable pivot means, a pneumatic system including a nozzle mounted for effective cooperation with said balance means and a force of air under pressure for supplying air to said nozzle, whereby tilting of said balance means varies the air flow to said nozzle to vary the pressure in said system, a first element bearing against said balance means and being yieldably responsive to a restricted value of a pressure representative of a first measured condition, a first adjustable restriction means of restricting said pneumatic pressure representative of a first measured condition, a second element bearing against said balance means and being yieldably responsive to a pressure corresponding to a set point of said pneumatic force balance instrument, a third element bearing against said balance means and being yieldably responsive to said pneumatic pressure in said system, a fourth element bearing against said balance means and being yieldably responsive to a restricted value of said pneumatic pressure in said system, and a second adjustable restriction means of restricting said pneumatic pressure in said system, said first and said second restriction means adjusted so that $R_1C_1$ equals $R_2C_2$ wherein $R_1$ is the resistance of said first restriction means, $R_2$ is the resistance of said second restriction means, $C_1$ is the capacitance of said first element and $C_2$ is the capacitance of said second element, whereby a pressure is established in said system that is an integrated value of said measured condition.

References Cited in the file of this patent

UNITED STATES PATENTS 2,742,917     Bowditch _____ Apr. 24, 1956

FOREIGN PATENTS 536,537     Great Britain _____ May 19, 1941

OTHER REFERENCES

Fundamentals of Automatic Control, by G. H. Farrington; published 1951, by Chapman and Hall, Ltd., London, pp. 256 and 257.